(12) United States Patent
Todoroki

(10) Patent No.: US 9,796,216 B2
(45) Date of Patent: Oct. 24, 2017

(54) HEAVY DUTY TIRE

(71) Applicant: SUMITOMO RUBBER INDUSTRIES, LTD., Kobe-shi, Hyogo (JP)

(72) Inventor: Daisuke Todoroki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 325 days.

(21) Appl. No.: 14/555,304

(22) Filed: Nov. 26, 2014

(65) Prior Publication Data

US 2015/0174966 A1 Jun. 25, 2015

(30) Foreign Application Priority Data

Dec. 19, 2013 (JP) ................................. 2013-262830

(51) Int. Cl.
*B60C 11/04* (2006.01)
*B60C 11/03* (2006.01)
(Continued)

(52) U.S. Cl.
CPC ............ *B60C 11/04* (2013.01); *B60C 9/1835* (2013.01); *B60C 11/0306* (2013.01);
(Continued)

(58) Field of Classification Search
CPC ............................. B60C 11/04; B60C 11/0306
(Continued)

(56) References Cited

U.S. PATENT DOCUMENTS

2008/0047643 A1* 2/2008 Takahashi ........... B60C 11/0306
152/209.26
2010/0084069 A1* 4/2010 Maruoka ............... B60C 9/2006
152/527
(Continued)

FOREIGN PATENT DOCUMENTS

| EP | 2 639 084 A1 | 9/2013 |
| JP | 2012-20714 A | 2/2012 |
| WO | WO 2010/055659 A1 | 5/2010 |

OTHER PUBLICATIONS

Extended European Search Report, dated May 19, 2015, for European Application No. 14192968.7.

*Primary Examiner* — Timothy Kennedy
(74) *Attorney, Agent, or Firm* — Birch, Stewart, Kolasch & Birch, LLP

(57) ABSTRACT

A heavy duty tire is disclosed. The distance from the radially outer surface of a belt layer to the tire's inner surface is 15 to 23 mm when measured along a tire radial direction line passing through the bottom of a shoulder main groove. The width of the shoulder main groove is more than the width of a center main groove. The ratio Wc:Wm:Ws of the average width Wc of a center land portion, the average width Wm of a middle land portion, and the average width Ws of a shoulder land portion is 1.00:1.00 to 1.08:1.03 to 1.13. The middle land portion is provided with a plurality of middle axial grooves. The shoulder land portion is provided with a plurality of shoulder axial grooves. The width of the shoulder axial groove is more than the width of the middle axial groove. The angle θs of the shoulder axial groove is more than the angle θm of the middle axial groove with respect to the tire axial direction.

12 Claims, 6 Drawing Sheets

(51) Int. Cl.
*B60C 9/18* (2006.01)
*B60C 11/00* (2006.01)

(52) U.S. Cl.
CPC .............. *B60C 2011/0033* (2013.01); *B60C 2011/0346* (2013.01); *B60C 2011/0365* (2013.01); *B60C 2011/0372* (2013.01); *B60C 2011/0388* (2013.01); *B60C 2200/06* (2013.01)

(58) Field of Classification Search
USPC .................................... 152/209.18
See application file for complete search history.

(56) References Cited

U.S. PATENT DOCUMENTS

2010/0139834 A1* 6/2010 Koga ................. B60C 3/04
152/560
2011/0220261 A1 9/2011 Matsuzawa \* cited by examiner

HEAVY DUTY TIRE

TECHNICAL FIELD

The present invention relates to a heavy duty tire improved in uneven wear resistance while maintaining wet performance.

BACKGROUND ART

A heavy duty tire provided in the tread portion with a plurality of blocks divided by a circumferentially extending main groove and axially extending axial grooves, has been proposed (for example, in the following patent document 1). such tire is effectively improved in wet performance by the main groove and the axial grooves.

However, such tire has a problem with the tread portion in which uneven wear is liable to occur. Particularly, such tire has a problem such that uneven wear is liable to occur at both edges of a shoulder main groove.

PRIOR ART DOCUMENT

Patent document

[Patent document 1] International publication No. WO2010/055659

SUMMARY OF INVENTION

Technical Problem

The present inventors were, as a result of the earnest research, discovered that the wear at both edges of the shoulder main groove can be evened by specifically defining a distance from the outer surface of the belt layer to the tire's inner surface along a tire radial direction line passing through the groove bottom of the shoulder main groove.

The present invention was made with the view to the above-mentioned actual circumstances, and a primary object is to provide a heavy duty tire which is improved in the uneven wear resistance, while maintaining the wet performance.

Solution to Problem

The present invention is a heavy duty tire having a carcass extending from a tread portion to a bead portion through a sidewall portion, and a belt layer disposed on the outside in the tire radial direction of the carcass and in the tread portion, and characterized in that by being provided in the tread portion with a pair of circumferentially continuously extending center main grooves disposed on both outsides of the tire equator, and a pair of circumferentially continuously extending shoulder main grooves disposed axially outside the respective center main grooves, a center land portion between a pair of the center main grooves, a pair of middle land portions between the center main grooves and the shoulder main grooves, and a pair of shoulder land portions axially outside the shoulder main grooves are divided, in a tire meridian section including the tire rotational axis, the belt layer extends at least to a position axially outside each shoulder main groove from the tire equatorial plane, along a tire radial direction line passing through the groove bottom of the shoulder main groove, the distance t1 from the radially outer surface of the belt layer to the tire's inner surface is 15 to 23 mm, the groove width of each shoulder main groove is more than the groove width of the center main groove, the ratio We:Wm:Ws of the average width We in the tire axial direction of the center land portion, the average width Wm in the tire axial direction of the middle land portion, and the average width Ws in the tire axial direction of the shoulder land portion is 1.00:1.00 to 1.08:1.03 to 1.13, the middle land portion is provided with a plurality of middle axial grooves inclined with respect to the tire axial direction, the shoulder land portion is provided with a plurality of shoulder axial grooves inclined with respect to the tire axial direction, the groove width of the shoulder axial groove is more than the groove width of the middle axial groove, and the angle $\theta s$ of the shoulder axial groove with respect to the tire axial direction is more than the angle $\theta m$ of the middle axial groove with respect to the tire axial direction.

In the heavy duty tire according to the present invention, it is preferable that the center main groove and the shoulder main grooves are zigzag.

In the heavy duty tire according to the present invention, it is preferable that the middle axial grooves in one middle land portion are inclined oppositely to the middle axial grooves in the other middle land portion, and the shoulder axial grooves in one shoulder land portion are inclined oppositely to the shoulder axial groove in the other shoulder land portion.

In the heavy duty tire according to the present invention, it is preferable that the tread portion is provided with a belt cushion rubber filling up a space between an axially outer edge portion of the belt layer and the carcass and having a substantially triangular cross sectional shape, the axially inner end of the belt cushion rubber is disposed axially inside the shoulder main groove, and the thickness t2 of the belt cushion rubber along the tire radial direction line is not less than 2.0 mm.

In the heavy duty tire according to the present invention, it is preferable that the complex elastic modulus E* of the belt cushion rubber is 3.5 to 4.5 MPa.

In the heavy duty tire according to the present invention, it is preferable that the ratio Pm/Pc of a ground pressure Pm of the middle land portion and a ground pressure Pc of the center land portion is 0.85 to 1.00 in a standard load state of the tire which is mounted on a standard wheel rim and applied by a standard inner pressure and ground contacted with a flat surface at the camber angle of 0 degree and loaded by a standard load.

Advantageous Effects of Invention

The heavy duty tire according to the present invention has the carcass extending from the tread portion to the bead portion through the sidewall portion, and the belt layer disposed on the outside in the tire radial direction of the carcass and in the tread portion.

Further, in the heavy duty tire according to the present invention, by being provided in the tread portion with a pair of the circumferentially continuously extending center main grooves disposed on both outsides of the tire equator, and a pair of the circumferentially continuously extending shoulder main grooves disposed axially outside the respective center main grooves, there are divided the center land portion between a pair of the center main grooves, a pair of the middle land portions between the center main grooves and the shoulder main grooves, and a pair of the shoulder land portions axially outside the shoulder main grooves.

In the tire meridian section including the tire rotational axis, the belt layer extends at least to the axially outside of each shoulder main groove from the tire equatorial plane, and the distance t1 from the radially outer surface of the belt layer to the tire's inner surface is 15 to 23 mm along the tire radial direction line passing through the groove bottom of the shoulder main groove. Thereby, bending deformation of the middle land portion and the shoulder land portion around the groove bottom portion of the shoulder main groove as a folding point is suppressed. Therefore, the ground pressure applied to both edges of the shoulder main groove and the amount of slippage between the edges and the road surface become evened. Accordingly, the uneven wear at both edges of the shoulder main groove is prevented.

The groove width of each shoulder main groove is more than the groove width of the center main groove. Thereby, during running in wet conditions, water between the tire and road surface is effectively discharged outwardly of the tire.

The ratio Wc:Wm:Ws of the average width Wc in the tire axial direction of the center land portion, the average width Wm in the tire axial direction of the middle land portion, and the average width Ws in the tire axial direction of the shoulder land portion is 1.00:1.00 to 1.08:1.03 to 1.13. Thereby, the ground pressure of the center land portion, the middle land portions and the shoulder land portions becomes evened, and uneven wear is effectively prevented.

The middle land portion is provided with a plurality of the middle axial grooves inclined with respect to the tire axial direction, and the shoulder land portion is provided with a plurality of the shoulder axial grooves inclined with respect to the tire axial direction. such middle axial grooves and shoulder axial grooves improve wet performance.

The groove width of the shoulder axial groove is more than the groove width of the middle axial groove. such shoulder axial grooves effectively discharge water between the tire and road surface outwardly of the tire during running in wet conditions.

The angle θs of the shoulder axial groove with respect to the tire axial direction is more than the angle θm of the middle axial groove with respect to the tire axial direction. such shoulder axial grooves improve a circumferential rigidity balance between the shoulder land portion and the middle land portion and improves the uneven wear resistance.

Accordingly, the pneumatic tire according to the present invention can be improved in the uneven wear resistance while maintaining the wet performance.

BEST MODE FOR CARRYING OUT INVENTION

Embodiments of the present invention will now be described in detail in conjunction with the accompanying drawings.

Figure 1:
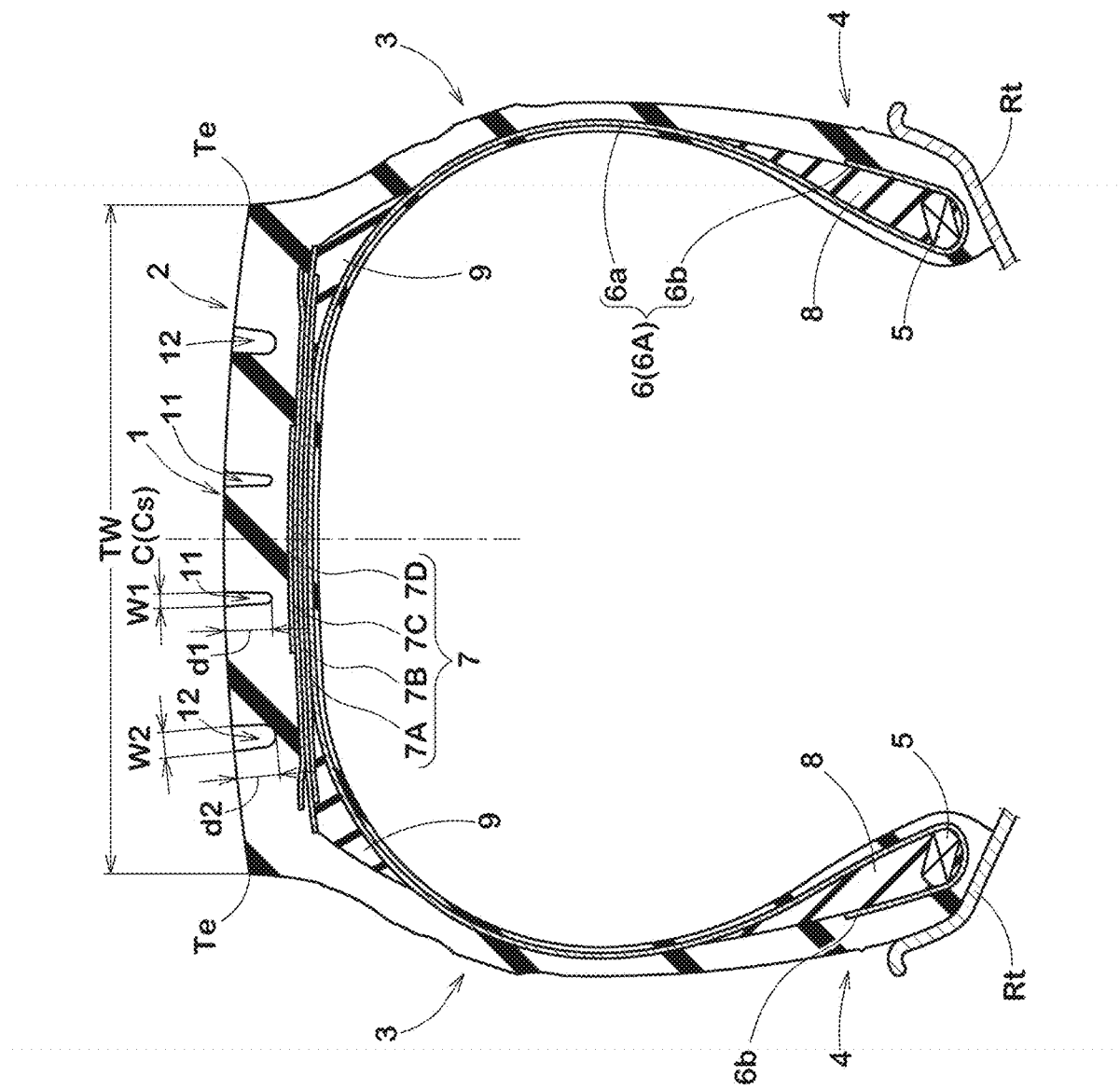
FIG. 1 is a cross sectional view of a heavy duty tire showing an embodiment of the present invention.

FIG. 1 is a meridian cross sectional view including the tire rotational axis, of a heavy duty tire 1 in this embodiment (hereinafter, simply called "tire" depending on circumstances) under a normal state.

Figure 2:
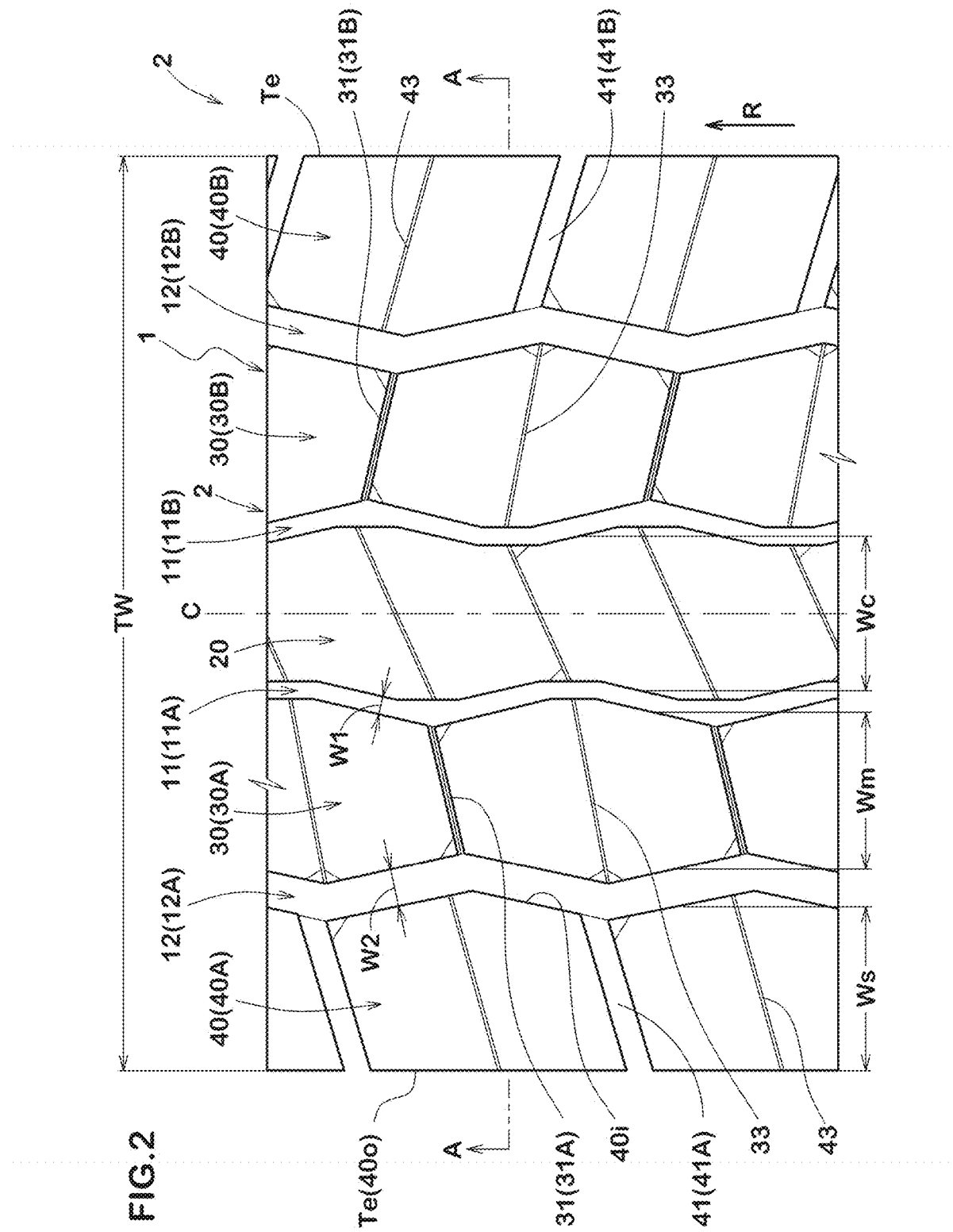
FIG. 2 is a developed plan view of the tread portion in FIG. 1.

FIG. 2 is a developed plan view of a tread portion 2 of the tire 1 in FIG. 1. In FIG. 1, a cross sectional view taken along line A-A in FIG. 2 is shown.

In this embodiment, the tire 1 is a tubeless tire to be mounted on a 15-degree taper rim Rt.

The normal state is such a state that the tire is mounted on a standard wheel rim, inflated to a normal inner pressure, and loaded with no load.

Hereinafter, dimensions and the like of various tire portions of the tire refer to values measured under the normal state unless otherwise noted.

The "standard wheel rim" is a wheel rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The tire 1 in this embodiment has a carcass 6 and a belt layer 7.

The carcass 6 is toroidal, extending from the tread portion 2 to bead cores 5 in bead portions 4 through sidewall portions 3.

The carcass 6 is constructed by a carcass ply 6A of carcass cords for example arranged at an angle of 80 to 90 degrees with respect to the tire equator C.

At each end of a main portion 6a extending between the bead cores 5, 5, the carcass ply 6A continuously has a turned up portion 6b folded around the bead core 5 from the axially inside to the outside.

Between the main portion 6a and the turned up portion 6b, a bead apex rubber 8 made of hard rubber is disposed. The bead apex rubber 8 has a triangular cross sectional shape extending radially outwardly from the bead core 5. Thereby, the sidewall portion 3 and the bead portion 4 are reinforced with respect to the bending rigidity.

The bead core 5 has a horizontally long hexagonal cross sectional shape having a low aspect ratio, and a radially inner surface thereof is inclined at an angle of from 12 to 18 degrees with respect to the tire axial direction so that the engaging force with the wheel rim Rt is increased over a wide range.

The belt layer 7 is disposed on the outside in the tire radial direction of the carcass 6 and in the tread portion 2. For example, the belt layer 7 is constructed by a plurality of belt plies using steel belt cords.

The belt layer 7 in this embodiment include an innermost belt ply 7A and belt plies 7B, 7c and 7D disposed on the outside thereof in this order.

For example, the belt cords in the belt ply 7A are arranged at an angle of about 60+/−10 degrees with respect to the tire equator C. For example, in the belt plies 7B, 7C and 7D, the belt cords are arranged at small angles of about 15 to 35 degrees with respect to the tire equator C.

The belt layer 7 is provided with at least one position where the belt cords are crosswise between the plies so as to increase the rigidity of the belt and to stiffly reinforce the substantially entire width of the tread portion 2.

As shown in FIG. 2, the tread portion 2 of the heavy duty tire 1 in this embodiment has a directional pattern in which the rotational direction R of the tire is specified.

The tread portion 2 of the tire 1 in this embodiment is provided with center main grooves 11 and shoulder main grooves 12. Thereby, the tread portion 2 is partitioned into a center land portion 20 between a pair of the center main grooves 11, 11, a pair of middle land portions 30, 30 between the center main grooves 11 and the shoulder main grooves 12, and a pair of shoulder land portions 40, 40 axially outside the shoulder main grooves 12.

One pair of the center main grooves 11 are provided on both outsides of the tire equator c. Each center main groove 11 extends continuously in the tire circumferential direction in a zigzag manner. The phase of the zigzag of the center main groove 11A on one side of the tire equator C is circumferentially shifted from the phase of the zigzag of the center main groove 11B on the other side of the tire equator c.

For example, the width W1 of the center main groove 11 is 1.5% to 3.0% of the tread width TW. For example, the depth d1 of the center main groove 11 (shown in FIG. 1) is 8 to 25 mm. Such center main grooves 11 exert excellent wet performance.

The tread width TW is the axial distance between the tread ground contact edges Te, Te of the tire 1 under the normal state.

The tread ground contact edge Te is the axially outermost ground contacting position when the tire 1 under the normal state is load with a standard load and ground-contacted with a flat surface at a camber angle of zero degree.

The "standard load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

One pair of the shoulder main grooves 12 are disposed axially outward of the respective center main grooves 11. Each shoulder main groove 12 extends continuously in the tire circumferential direction in a zigzag manner.

The zigzag pitches of the shoulder main groove 12 are comparable to the zigzag pitches of the center main groove 11.

The phase of the zigzag of the shoulder main groove 12A on one side of the tire equator C is circumferentially shifted from the phase of the zigzag of the shoulder main groove 12B on the other side of the tire equator.

The zigzag phases of the adjacent shoulder main groove 12 and center main groove 11 are circumferentially shifted from each other.

The width W2 of the shoulder main groove 12 is more than the groove width W1 of the center main groove 11. Thereby, during running in wet conditions, water between the tire and road surface is effectively discharged outwardly of the tire.

The width W2 of the shoulder main groove 12 is preferably not less than 1.85 times, more preferably not less than 2.00 times, but preferably not more than 2.40 times, more preferably not more than 2.25 times the groove width W1 of the center main groove 11. Thereby, uneven wear resistance is improved, while maintaining the wet performance.

Figure 3:
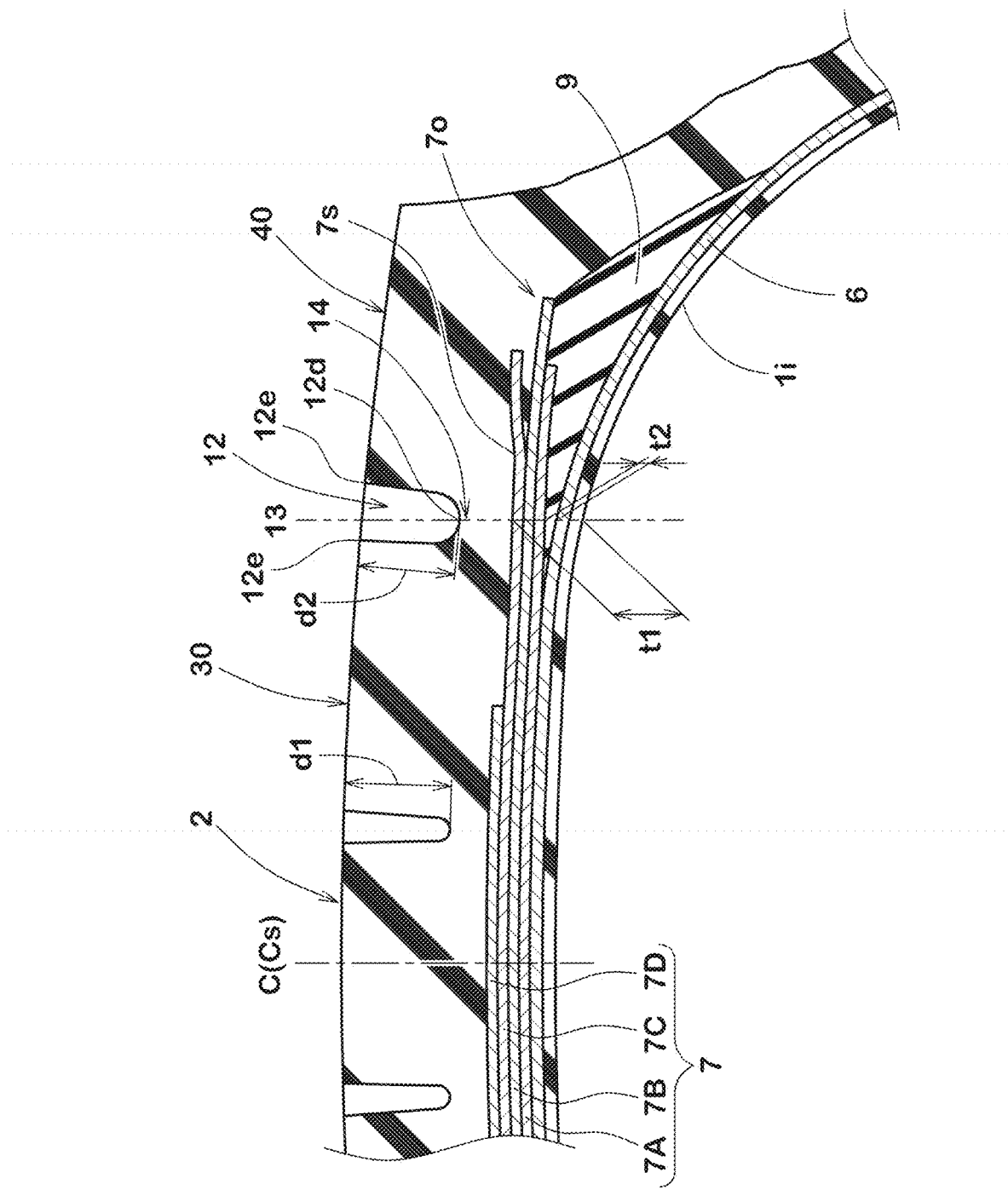
FIG. 3 is an enlarged cross sectional view of the tread portion in FIG. 1.

In FIG. 3, an enlarged cross sectional view of the tread portion 2 is shown. As shown in FIG. 3, the depth d2 of the shoulder main groove 12 is 8 to 25 mm, for example.

The belt layer 7 extends at least to a position axially outside each shoulder main groove 12 from the tire equatorial plane Cs.

Further, measured along a tire radial direction line 13 passing the groove bottom 12d of the shoulder main groove 12, a distance t1 from the radially outer surface 7s of the belt layer 7 to the tire's inner surface 1i is 15 to 23 mm.

Thereby, it is possible to prevent bending deformation of the middle land portion 30 and the shoulder land portion 40 possibly occurring around the groove bottom portion 14 of the shoulder main groove 12 as a folding point when ground contacting with a road surface. Therefore, the ground pressure applied to both edges 12e, 12e of the shoulder main groove 12 and the amount of slippage between the edges 12e, 12e and the road surface become evened. Accordingly, uneven wear at both edges 12e of the shoulder main groove 12 is prevented.

The distance t1 is preferably not less than 16.5 mm, more preferably not less than 18.0 mm, but preferably not more than 21.5 mm, more preferably not more than 20.0 mm. Thereby, the uneven wear at the edge 12e of the shoulder main groove 12 is more effectively prevented.

As shown in FIG. 2, the axial width of each of the center land portion 20, middle land portions 30 and shoulder land portions 40 is changed periodically in the tire circumferential direction. For example, the average axial width of each land portion is 0.13 to 0.21 times the tread width TW.

The ratio Wc:Wm:Ws of the average width Wc in the tire axial direction of the center land portion 20, the average width Wm in the tire axial direction of the middle land portion 30, and the average width Ws in the tire axial direction of the shoulder land portion 40 is 1.00:1.00 to 1.08:1.03 to 1.13. Thereby, the ground pressure of the center land portion 20, the middle land portions 30 and the shoulder land portions 40 becomes evened, and uneven wear is effectively prevented.

The ratio Wm/Wc of the average width Wm of the middle land portion 30 and the average width Wc of the center land portion 20 is preferably not less than 1.02, more preferably not less than 1.03, but preferably not more than 1.06, more preferably not more than 1.05. Thereby, uneven wear of the center land portion 20 and the middle land portions 30 is further prevented.

The ratio Ws/Wc of the average width Ws of the shoulder land portion 40 and the average width Wc of the center land portion 20 is preferably not less than 1.05, more preferably not less than 1.07, but preferably not more than 1.11, more preferably not more than 1.09. Thereby, uneven wear of the shoulder land portions 40 is effectively prevented.

Figure 4:
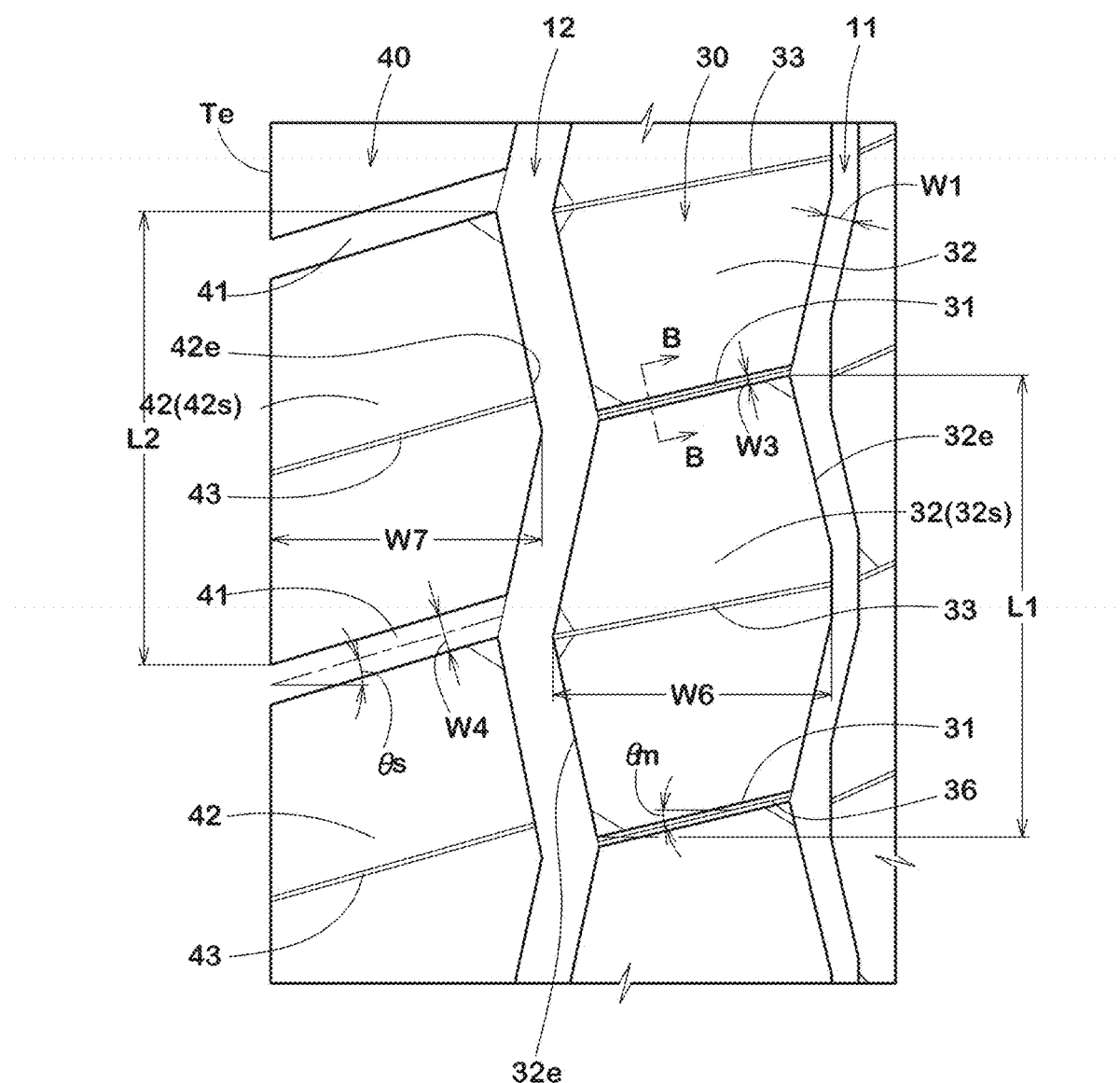
FIG. 4 is an enlarged developed plan view the middle land portion and the shoulder land portion in FIG. 2.

In FIG. 4, an enlarged view of the middle land portion 30 and the shoulder land portion 40 is shown. As shown in FIG. 4, the middle land portion 30 is provided with a plurality of middle axial grooves 31 inclined with respect to the tire axial direction.

The middle axial grooves 31 communicate between the center main groove 11 and the shoulder main groove 12. The middle axial groove 31 extends straight. For example, the groove width W3 of the middle axial groove 31 is 0.30 to 0.45 times the groove width W1 of the center main groove 11. For example, the middle axial groove 31 is inclined at an angle θm of 10 to 15 degrees with respect to the tire axial direction. such middle axial groove 31 exerts excellent wet performance, while suppressing the uneven wear of the middle land portion 30.

Figure 5:
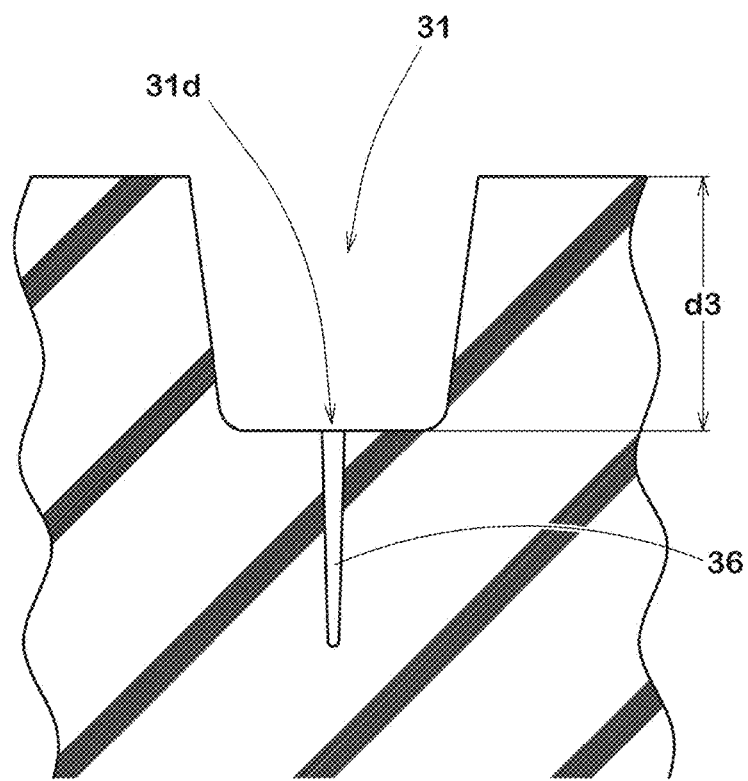
FIG. 5 is an enlarged cross sectional view of a middle axial groove.

In FIG. 5, a cross sectional view of the middle axial groove 31 taken along line B-B in FIG. 4 is shown. As shown in FIG. 5, the groove depth d3 of the middle axial groove 31 is, for example, 0.20 to 0.25 times the groove depth d1 of the center main groove 11.

For example, the middle axial groove 31 is provided with a groove bottom sipe 36 opened in a groove bottom portion 31d.

In this specification, the "sipe" is a cut having a width of not more than about 1.5 mm or no substantial width and is distinguished from a groove for the purpose of drainage.

As shown in FIG. 4, the shoulder land portion 40 is provided with a plurality of shoulder axial grooves 41 inclined with respect to the tire axial direction.

The shoulder axial grooves 41 communicate between the shoulder main groove 12 and the tread ground contact edge Te. The shoulder axial groove 41 extends straight.

The groove width W4 of the shoulder axial groove 41 is more than the groove width W3 of the middle axial groove 31. such shoulder axial grooves 41 effectively discharge water between the tire and road surface outwardly of the tire during running in wet conditions.

The ratio W3/W4 of the groove width W3 of the middle axial groove 31 and the groove width W4 of the shoulder axial groove 41 is preferably not less than 0.25, more preferably not less than 0.28, but preferably not more than 0.35, more preferably not more than 0.32. Such shoulder axial grooves 41 and middle axial grooves 31 prevent uneven wear of the middle land portion 30 and the shoulder land portion 40, while exerting excellent wet performance.

The angle θs of the shoulder axial groove 41 with respect to the tire axial direction is more than the angle θm of the middle axial groove 31 with respect to the tire axial direction. Such shoulder axial grooves 41 improve a circumferential rigidity balance between the shoulder land portion 40 and the middle land portion 30, and improve uneven wear resistance.

The angle difference θs−θm between the angle θs of the shoulder axial groove 41 and the angle θm of the middle axial groove 31 is preferably not less than 2.5 degrees, more preferably not less than 3.5 degrees, but preferably not more than 5.5 degrees, more preferably not more than 4.5 degrees. Thereby, the uneven wear resistance of the shoulder land portion 40 and the middle land portion 30 is further improved.

The groove depth d4 of the shoulder axial groove 41 (not shown) is preferably not less than 2.2 times, more preferably not less than 2.5 times, but and preferably not more than 3.0 times, more preferably not more than 2.7 times the groove depth d3 of the middle axial groove 31 (shown in FIG. 5). Thereby, the uneven wear resistance of the shoulder land portion 40 is improved, while exerting excellent wet performance and wandering performance.

It is preferable that, as shown in FIG. 2, the shoulder axial grooves 41A in one shoulder land portion 40A are inclined oppositely to the shoulder axial groove 41B in the other shoulder land portion 40B. It is preferable that each shoulder axial groove 41 is inclined to a tire rotational direction R towards the tire equator C side from the tread ground contact edge Te side. such shoulder axial grooves 41 effectively discharge water axially outwardly during running in wet conditions.

It is preferable that the adjacent shoulder axial grooves 41 and middle axial grooves 31 on one side or the other side of the tire equator c are inclined to the same direction. Thereby, the amount of wear of middle land portion 30 and the amount of wear of the shoulder land portion 40 during running become evened.

It is preferable that the middle axial grooves 31A in one middle land portion 30A are inclined oppositely to the middle axial grooves 31B in the other middle land portion 30B. It is preferable that each middle axial groove 31 is inclined to the tire rotational direction R towards the tire equator C side from the tread ground contact edge Te side. such middle axial grooves 31 effectively discharge water axially outwardly during running in wet conditions.

As shown in FIG. 4, the middle land portion 30 is a row of a plurality of middle blocks 32 divided by the middle axial grooves 31. The ground contacting surface 32s of the middle block 32 has a substantially hexagonal shape of which both edges 32e, 32e in the axial direction are convex.

The ratio W6/L1 of the axial width W6 and the circumferential length L1 of the ground contacting surface 32s of the middle block 32 is preferably not less than 0.50, more preferably not less than 0.55, but preferably not more than 0.70, more preferably not more than 0.65. such middle block 32 maintains the block rigidity in the tire circumferential direction and axial direction in a well balanced manner and improves steering stability.

It is preferable that the middle block 32 is provided with a middle sipe 33 communicating between the center main groove 11 and the shoulder main groove 12. such middle sipe 33 exerts an edge effect and improves wet performance.

The depth d5 of the middle sipe 33 (not shown) is preferably not less than 0.50 times, more preferably not less than 0.60 times, but preferably not more than 0.80 times, more preferably not more than 0.70 times the groove depth d1 of the center main groove 11 (shown in FIG. 1). such middle sipe 33 satisfies both of wet performance and uneven wear resistance.

The shoulder land portion 40 is a row of a plurality of shoulder blocks 42 divided by the shoulder axial grooves 41. The ground contacting surface 42s of the shoulder block 42 has a substantially pentagonal shape of which an axially inner edge 42e is convex.

The ratio W7/L2 of the axial width W7 and the tire circumferential length L2 of the ground contacting surface 42s of the shoulder block 42 is preferably not less than 0.50, more preferably not less than 0.55, but preferably not more than 0.70, more preferably not more than 0.65. such shoulder blocks 42 exert excellent wandering performance while suppressing uneven wear of the block.

It is preferable that the shoulder block 42 is provided with a shoulder sipe 43 communicating between the shoulder main groove 12 and the tread ground contact edge Te. such shoulder sipe 43 improves wet performance.

Figure 6:
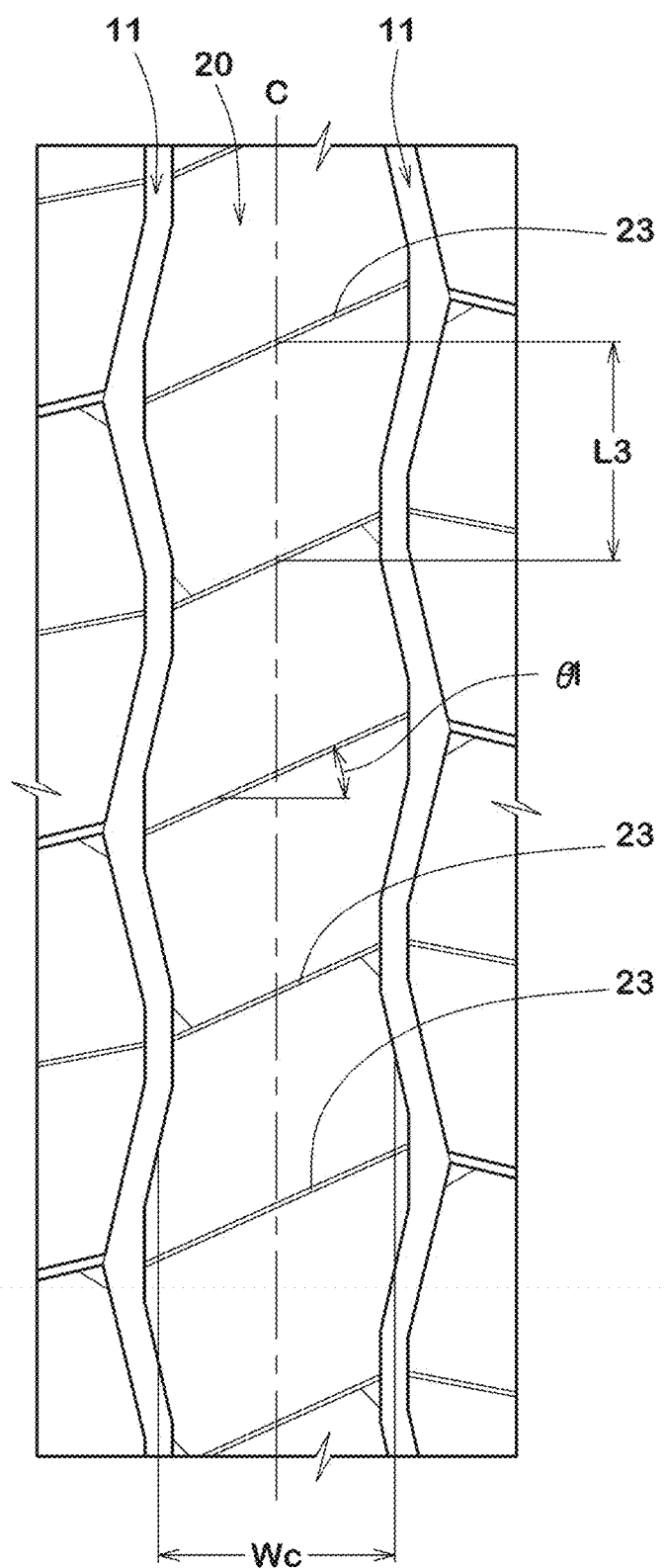
FIG. 6 is an enlarged developed plan view a center land portion.

In FIG. 6, an enlarged view of the center land portion 20 is shown. As shown in FIG. 6, the center land portion 20 is a rib not provided with a groove whose groove width is more than a sipe. such center land portion 20 exerts excellent uneven wear resistance and reduces the rolling resistance.

It is preferable that the center land portion 20 is provided with a center sipe 23 communicating between the center main grooves 11, 11. such center sipe 23 improves wet performance by its edge effect.

For example, the center sipe 23 extends straight, inclining with respect to the tire axial direction. The angle θ1 of the center sipe 23 with respect to the tire axial direction is preferably not less than 20 degrees, more preferably not less than 23 degrees, but preferably not more than 28 degrees, more preferably not more than 25 degrees. such center sipe 23 exerts an edge effect in the tire circumferential direction and axial direction in a well balanced manner.

At the tire equator C, the interval L3 between the center sipes 23, 23 which are adjacent in the tire circumferential direction is preferably not less than 0.90 times, more preferably not less than 0.92 times, but preferably not more than 0.98 times, more preferably not more than 0.96 times the average width We of the center land portion 20. Thereby, excellent wet performance is exerted while maintaining the rigidity of the center land portion 20.

As shown in FIG. 2, the land ratio Lr of the tread portion 2 of the heavy duty tire in this embodiment is preferably not less than 70%, more preferably not less than 75%, but preferably not more than 85%, more preferably not more than 82%. Thereby, uneven wear resistance is improved, while maintaining the wet performance.

In this specification, the "land ratio" means a ratio sb/sa of the actual total ground contacting area sb to the overall surface sa of an imaginary ground contacting surface between the tread ground contact edges Te, Te in which all of the grooves and sipes are filled.

The number N of the blocks in each row is preferably not less than 35, more preferably not less than 38, but preferably not more than 45, more preferably not more than 43. Thereby, the circumferential rigidity of the block is secured, and uneven wear resistance is improved.

Under a standard load state of the tire mounted on the standard wheel rim and inflated to the normal inner pressure and ground-contacted with a flat surface at the camber angle of 0 degree and loaded with the standard load, it is preferable that the ratio Pm/Pc of the ground pressure Pm of the middle land portion 30 and the ground pressure PC of the center land portion 20 is preferably not less than 0.85, more preferably not less than 0.90, but preferably not more than 1.00, more preferably not more than 0.95. Thereby, the amount of wear of the center land portion 20 and the amount of wear of the middle land portion 30 during running become evened.

Under the standard load state, the ratio Ps/Pc of the ground pressure PS of the shoulder land portion 40 and the ground pressure Pc of the center land portion 20 is preferably not less than 0.70, more preferably not less than 0.75, but preferably not more than 0.90, more preferably not more than 0.85. Thereby, the amount of wear of the shoulder land portion 40 and the amount of wear of the center land portion 20 during running become evened.

Under the standard load state, the ratio Po/Pi of the ground pressure Po at the axially outer edge 40o of the shoulder land portion 40 and the ground pressure Pi at the axially inner edge 40i of the shoulder land portion 40 is preferably not less than 0.80, more preferably not less than 0.85, but preferably not more than 1.00, more preferably not more than 0.95. Thereby, the uneven wear of the shoulder land portion 40 is effectively prevented.

As shown in FIG. 3, it is preferable that the tread portion 2 is provided with a belt cushion rubber 9 having a substantially triangular cross sectional shape and filling up a space between the carcass 6 and an axially outer edge portion 7o of the belt layer 7. it is preferable that the complex elastic modulus E* of the belt cushion rubber 9 is, for example, 3.5 to 4.5 MPa. such belt cushion rubber 9 prevents damage of the belt layer 7 starting from the outer edge portion 7o of the belt layer 7, and suppresses uneven wear of the shoulder land portion.

In this specification, the complex elastic modulus E* of rubber is a value measured according to JIS-K6394 under the following conditions by the use of a viscoelastic spectrometer manufactured by (KK) Iwamoto Seisakusyo.
Initial strain: 10%
Amplitude: +/−2%
Frequency: 10 Hz
Deformation mode: tensile
Measuring temperature: 70 degrees C.

On the tire radial direction line 13, the thickness t2 of the belt cushion rubber 9 is preferably not less than 2.0 mm, more preferably not less than 3.0 mm, but preferably not more than 5.0 mm, more preferably not more than 4.0 mm. Thereby, separation of the belt layer 7 is prevented, and the uneven wear of the shoulder land portion 40 is prevented.

While detailed description has been made of the heavy duty tire according to the1 present invention, the illustrated embodiment should not be construed as to limit the scope of the present invention; various modifications are possible without departing from the scope of the present invention.

Embodiments

Heavy duty tires of size 11R22.5 having the basic structure shown in FIG. 1 and the basic pattern shown in FIG. 2 were experimentally manufactured according to specifications listed in Table 1. Each of the test tires was tested for the wet performance and the uneven wear resistance.

Specifications common to the test tires and test methods are as follows:
wheel rim: 7.50×22.5
Tire inner pressure: 800 kPa
Test car: 10t truck
Tire installed positions: all wheels <Wet Performance>

The above-mentioned test car entered into a wet asphalt road surface with a 2 mm thick water film at 65 km/h, and made a hard stop to measure a time required to reduce the speed of the test car from 60 Km/h to 20 Km/h. The result is an index based on the value of comparative example 1 being 100, wherein the smaller value means the shorter time, namely, the better wet performance.

<Uneven Wear Resistance>

The above-the mentioned test car under its gross vehicle weight rating, ran for 10000 km, and both edges of the shoulder main groove was measured for height difference. The result is an index based on comparative example 1 being 100, wherein the smaller value means the smaller height difference, namely, the better uneven wear resistance.

The test results are shown in Table 1.

As apparent from Table 1, it was confirmed that the heavy duty tires of Embodiments were improved in the uneven wear resistance while maintaining the wet performance.

REFERENCE SIGNS LIST

TABLE 1

|  | comparative example 1 | comparative example 2 | embodiment 1 | embodiment 2 | embodiment 3 |
| --- | --- | --- | --- | --- | --- |
| distance t1 (mm) from outer surface of belt layer to tire inner surface | 25.0 | 13.0 | 19.0 | 15.0 | 16.5 |
| average width Wm of middle land portion/ average width Wc of center land portion | 1.00 | 1.04 | 1.04 | 1.04 | 1.04 |
| average width Ws of shoulder land portion/ average width Wc of center land portion | 1.00 | 1.08 | 1.08 | 1.08 | 1.08 |

TABLE 1-continued

| | | | | | |
|---|---|---|---|---|---|
| width W3 (mm) of middle axial groove | 4.0 | 1.8 | 1.8 | 1.8 | 1.8 |
| angle θm (deg.) of middle axial groove | 12.5 | 12.5 | 12.5 | 12.5 | 12.5 |
| width W4 (mm) of shoulder axial groove | 4.0 | 6.0 | 6.0 | 6.0 | 6.0 |
| angle θs (deg.) of shoulder axial groove | 12.5 | 16.5 | 16.5 | 16.5 | 16.5 |
| thickness t2 (mm) of belt cushion rubber | 3.5 | 3.5 | 3.5 | 3.5 | 3.5 |
| complex elastic modulus E* (MPa) of belt cushion rubber | 4.0 | 4.0 | 4.0 | 4.0 | 4.0 |
| wet performance (index) | 100 | 92 | 90 | 92 | 92 |
| wear resistance (index) | 100 | 97 | 85 | 93 | 92 |

| | embodiment 4 | embodiment 5 | embodiment 6 | embodiment 7 | comparative example 3 |
|---|---|---|---|---|---|
| distance t1 (mm) from outer surface of belt layer to tire inner surface | 18.0 | 20.0 | 21.5 | 23.0 | 25.0 |
| average width Wm of middle land portion/ average width Wc of center land portion | 1.04 | 1.04 | 1.04 | 1.04 | 1.04 |
| average width Ws of shoulder land portion/ average width Wc of center land portion | 1.08 | 1.08 | 1.08 | 1.08 | 1.08 |
| width W3 (mm) of middle axial groove | 1.8 | 1.8 | 1.8 | 1.8 | 1.8 |
| angle θm (deg.) of middle axial groove | 12.5 | 12.5 | 12.5 | 12.5 | 12.5 |
| width W4 (mm) of shoulder axial groove | 6.0 | 6.0 | 6.0 | 6.0 | 6.0 |
| angle θs (deg.) of shoulder axial groove | 16.5 | 16.5 | 16.5 | 16.5 | 16.5 |
| thickness t2 (mm) of belt cushion rubber | 3.5 | 3.5 | 3.5 | 3.5 | 3.5 |
| complex elastic modulus E* (MPa) of belt cushion rubber | 4.0 | 4.0 | 4.0 | 4.0 | 4.0 |
| wet performance (index) | 91 | 90 | 91 | 92 | 92 |
| wear resistance (index) | 88 | 89 | 92 | 94 | 98 |

| | comparative example 4 | embodiment 8 | embodiment 9 | embodiment 10 | embodiment 11 |
|---|---|---|---|---|---|
| distance t1 (mm) from outer surface of belt layer to tire inner surface | 19.0 | 19.0 | 19.0 | 19.0 | 19.0 |
| average width Wm of middle land portion/ average width Wc of center land portion | 0.98 | 1.00 | 1.02 | 1.06 | 1.08 |
| average width Ws of shoulder land portion/ average width Wc of center land portion | 1.08 | 1.08 | 1.08 | 1.08 | 1.08 |
| width W3 (mm) of middle axial groove | 1.8 | 1.8 | 1.8 | 1.8 | 1.8 |
| angle θm (deg.) of middle axial groove | 12.5 | 12.5 | 12.5 | 12.5 | 12.5 |
| width W4 (mm) of shoulder axial groove | 6.0 | 6.0 | 6.0 | 6.0 | 6.0 |
| angle θs (deg.) of shoulder axial groove | 16.5 | 16.5 | 16.5 | 16.5 | 16.5 |
| thickness t2 (mm) of belt cushion rubber | 3.5 | 3.5 | 3.5 | 3.5 | 3.5 |
| complex elastic modulus E* (MPa) of belt cushion rubber | 4.0 | 4.0 | 4.0 | 4.0 | 4.0 |
| wet performance (index) | 91 | 92 | 92 | 92 | 93 |
| wear resistance (index) | 98 | 91 | 87 | 86 | 90 |

| | comparative example 5 | comparative example 6 | embodiment 12 | embodiment 13 | embodiment 14 |
|---|---|---|---|---|---|
| distance t1 (mm) from outer surface of belt layer to tire inner surface | 19.0 | 19.0 | 19.0 | 19.0 | 19.0 |
| average width Wm of middle land portion/ average width Wc of center land portion | 1.10 | 1.04 | 1.04 | 1.04 | 1.04 |
| average width Ws of shoulder land portion/ average width Wc of center land portion | 1.08 | 1.00 | 1.03 | 1.06 | 1.10 |
| width W3 (mm) of middle axial groove | 1.8 | 1.8 | 1.8 | 1.8 | 1.8 |
| angle θm (deg.) of middle axial groove | 12.5 | 12.5 | 12.5 | 12.5 | 12.5 |
| width W4 (mm) of shoulder axial groove | 6.0 | 6.0 | 6.0 | 6.0 | 6.0 |
| angle θs (deg.) of shoulder axial groove | 16.5 | 16.5 | 16.5 | 16.5 | 16.5 |
| thickness t2 (mm) of belt cushion rubber | 3.5 | 3.5 | 3.5 | 3.5 | 3.5 |
| complex elastic modulus E* (MPa) of belt cushion rubber | 4.0 | 4.0 | 4.0 | 4.0 | 4.0 |
| wet performance (index) | 93 | 90 | 91 | 91 | 92 |
| wear resistance (index) | 99 | 98 | 93 | 87 | 88 |

| | embodiment 15 | comparative example 7 | embodiment 16 | embodiment 17 | embodiment 18 |
|---|---|---|---|---|---|
| distance t1 (mm) from outer surface of belt layer to tire inner surface | 19.0 | 19.0 | 19.0 | 19.0 | 19.0 |
| average width Wm of middle land portion/ average width Wc of center land portion | 1.04 | 1.04 | 1.04 | 1.04 | 1.04 |
| average width Ws of shoulder land portion/ average width Wc of center land portion | 1.13 | 1.15 | 1.08 | 1.08 | 1.08 |
| width W3 (mm) of middle axial groove | 1.8 | 1.8 | 3.5 | 5.5 | 2.5 |
| angle θm (deg.) of middle axial groove | 12.5 | 12.5 | 12.5 | 12.5 | 12.5 |
| width W4 (mm) of shoulder axial groove | 6.0 | 6.0 | 6.0 | 6.0 | 3.5 |
| angle θs (deg.) of shoulder axial groove | 16.5 | 16.5 | 16.5 | 16.5 | 16.5 |

TABLE 1-continued

|  | | | | | |
|---|---|---|---|---|---|
| thickness t2 (mm) of belt cushion rubber | 3.5 | 3.5 | 3.5 | 3.5 | 3.5 |
| complex elastic modulus E* (MPa) of belt cushion rubber | 4.0 | 4.0 | 4.0 | 4.0 | 4.0 |
| wet performance (index) | 92 | 93 | 89 | 88 | 92 |
| wear resistance (index) | 91 | 97 | 89 | 92 | 91 |

|  | comparative example 8 | embodiment 19 | embodiment 20 | embodiment 21 | comparative example 9 |
|---|---|---|---|---|---|
| distance t1 (mm) from outer surface of belt layer to tire inner surface | 19.0 | 19.0 | 19.0 | 19.0 | 19.0 |
| average width Wm of middle land portion/average width Wc of center land portion | 1.04 | 1.04 | 1.04 | 1.04 | 1.04 |
| average width Ws of shoulder land portion/average width Wc of center land portion | 1.08 | 1.08 | 1.08 | 1.08 | 1.08 |
| width W3 (mm) of middle axial groove | 6.0 | 1.8 | 1.8 | 1.8 | 1.8 |
| angle θm (deg.) of middle axial groove | 12.5 | 13.5 | 15.0 | 13.5 | 17.5 |
| width W4 (mm) of shoulder axial groove | 3.5 | 6.0 | 6.0 | 6.0 | 6.0 |
| angle θs (deg.) of shoulder axial groove | 16.5 | 16.5 | 16.5 | 15.0 | 16.5 |
| thickness t2 (mm) of belt cushion rubber | 3.5 | 3.5 | 3.5 | 3.5 | 3.5 |
| complex elastic modulus E* (MPa) of belt cushion rubber | 4.0 | 4.0 | 4.0 | 4.0 | 4.0 |
| wet performance (index) | 92 | 90 | 89 | 91 | 90 |
| wear resistance (index) | 98 | 87 | 91 | 92 | 97 |

|  | embodiment 22 | embodiment 23 | embodiment 24 | embodiment 25 | embodiment 26 |
|---|---|---|---|---|---|
| distance t1 (mm) from outer surface of belt layer to tire inner surface | 19.0 | 19.0 | 19.0 | 19.0 | 19.0 |
| average width Wm of middle land portion/average width Wc of center land portion | 1.04 | 1.04 | 1.04 | 1.04 | 1.04 |
| average width Ws of shoulder land portion/average width Wc of center land portion | 1.08 | 1.08 | 1.08 | 1.08 | 1.08 |
| width W3 (mm) of middle axial groove | 1.8 | 1.8 | 1.8 | 1.8 | 1.8 |
| angle θm (deg.) of middle axial groove | 12.5 | 12.5 | 12.5 | 12.5 | 12.5 |
| width W4 (mm) of shoulder axial groove | 6.0 | 6.0 | 6.0 | 6.0 | 6.0 |
| angle θs (deg.) of shoulder axial groove | 16.5 | 16.5 | 16.5 | 16.5 | 16.5 |
| thickness t2 (mm) of belt cushion rubber | 2.0 | 3.0 | 4.0 | 5.0 | 3.5 |
| complex elastic modulus E* (MPa) of belt cushion rubber | 4.0 | 4.0 | 4.0 | 4.0 | 3.0 |
| wet performance (index) | 91 | 91 | 90 | 91 | 90 |
| wear resistance (index) | 93 | 87 | 88 | 93 | 91 |

|  | embodiment 27 | embodiment 28 | embodiment 29 |
|---|---|---|---|
| distance t1 (mm) from outer surface of belt layer to tire inner surface | 19.0 | 19.0 | 19.0 |
| average width Wm of middle land portion/average width Wc of center land portion | 1.04 | 1.04 | 1.04 |
| average width Ws of shoulder land portion/average width Wc of center land portion | 1.08 | 1.08 | 1.08 |
| width W3 (mm) of middle axial groove | 1.8 | 1.8 | 1.8 |
| angle θm (deg.) of middle axial groove | 12.5 | 12.5 | 12.5 |
| width W4 (mm) of shoulder axial groove | 6.0 | 6.0 | 6.0 |
| angle θs (deg.) of shoulder axial groove | 16.5 | 16.5 | 16.5 |
| thickness t2 (mm) of belt cushion rubber | 3.5 | 3.5 | 3.5 |
| complex elastic modulus E* (MPa) of belt cushion rubber | 3.5 | 4.5 | 5.0 |
| wet performance (index) | 90 | 91 | 91 |
| wear resistance (index) | 86 | 87 | 90 |

2 tread portion
3 sidewall portion
4 bead portion
6 carcass
7 belt layer
11 center main groove
12 shoulder main groove
20 center land portion
30 middle land portion
31 middle axial groove
40 shoulder land portion
41 shoulder axial groove

The invention claimed is:

1. A heavy duty tire having a carcass extending from a tread portion to a bead portion through a sidewall portion, and a belt layer disposed on the outside in the tire radial direction of the carcass and in the tread portion, wherein
the tread portion is provided with a pair of circumferentially continuously extending center main grooves disposed on both outsides of the tire equator, and a pair of circumferentially continuously extending shoulder main grooves disposed axially outside the respective center main grooves, so that the tread portion is divided into a center land portion between a pair of the center main grooves, a pair of middle land portions between the center main grooves and the shoulder main grooves, and a pair of shoulder land portions axially outside the shoulder main grooves, the belt layer extends at least to a position axially outside each said shoulder main groove from the tire equatorial plane, in a tire meridian section including the tire rotational axis, when measured along a tire radial direction line passing through the groove bottom of each said shoulder main groove, the distance t1 from the radially outer surface of the belt layer to the tire's inner surface is 15 to 23 mm, the groove width of each said shoulder main groove is more than the groove width of the center main grooves, the ratio Wc:Wm:Ws of an average width Wc in the tire axial direction of the center land portion, an average width Wm in the tire axial direction of the middle land portion, and an average width Ws in the tire axial direction of the shoulder land portion is 1.00:1.00 to 1.08:1.03 to 1.13, each said middle land portion is provided with a plurality of middle axial grooves which are straight grooves inclined with respect to the tire axial direction at an angle $\theta m$, each said shoulder land portion is provided with a plurality of shoulder axial grooves which are straight grooves inclined with respect to the tire axial direction at an angle $\theta s$, the groove width of the shoulder axial grooves is more than the groove width of the middle axial grooves, the angle $\theta s$ of the shoulder axial grooves with respect to the tire axial direction is greater than the angle $\theta m$ of the middle axial grooves with respect to the tire axial direction, on each side of the tire equator, the middle axial grooves and the shoulder axial grooves are inclined to one direction with respect to the tire axial direction, and the middle axial grooves and the shoulder axial grooves on one side of the tire equator are inclined in a direction opposite of the middle axial grooves and the shoulder axial grooves on the other side of the tire equator.

2. The heavy duty tire according to claim 1, wherein the center main grooves and the shoulder main grooves are zigzag grooves.

3. The heavy duty tire according to claim 1, wherein the tread portion is provided with a belt cushion rubber filling up a space between each axially outer edge portion of the belt layer and the carcass and having a substantially triangular cross sectional shape, the axially inner end of said belt cushion rubber is disposed axially inside the adjacent shoulder main groove, and the thickness t2 of the belt cushion rubber measured along said tire radial direction line is not less than 2.0 mm.

4. The heavy duty tire according to claim 3, wherein the complex elastic modulus E* of the belt cushion rubber is 3.5 to 4.5 MPa.

5. The heavy duty tire according to claim 1, wherein the ratio Pm/Pc of the ground pressure Pm of each said middle land portion and the ground pressure Pc of the center land portion is 0.85 to 1.00 in a standard load state of the tire mounted on a standard wheel rim and applied by a standard inner pressure and ground contacted with a flat surface at the camber angle of 0 degree and loaded by a standard load.

6. The heavy duty tire according to claim 1, wherein the center land portion is provided with center sipes extending straight and inclined with respect to the tire axial direction to the same direction as the middle axial grooves and the shoulder axial grooves on one side of the tire equator.

7. The heavy duty tire according to claim 1, wherein each of the shoulder land portions is provided with shoulder sipes extending straight and inclined with respect to the tire axial direction to the same direction as the shoulder axial grooves therein so that the shoulder sipes alternate with the shoulder axial grooves.

8. The heavy duty tire according to claim 1, wherein each of the middle land portions is provided with middle sipes extending straight and inclined with respect to the tire axial direction to the same direction as the middle axial grooves therein so that the middle sipes alternate with the middle axial grooves.

9. The heavy duty tire according to claim 1, wherein the center land portion is provided with center sipes extending straight and inclined with respect to the tire axial direction to the same direction as the middle axial grooves and the shoulder axial grooves on one side of the tire equator, and each of the shoulder land portions is provided with shoulder sipes extending straight and inclined with respect to the tire axial direction to the same direction as the shoulder axial grooves therein so that the shoulder sipes alternate with the shoulder axial grooves.

10. The heavy duty tire according to claim 1, wherein the center land portion is provided with center sipes extending straight and inclined with respect to the tire axial direction to the same direction as the middle axial grooves and the shoulder axial grooves on one side of the tire equator, and each of the middle land portions is provided with middle sipes extending straight and inclined with respect to the tire axial direction to the same direction as the middle axial grooves therein so that the middle sipes alternate with the middle axial grooves.

11. The heavy duty tire according to claim 1, wherein the center land portion is provided with center sipes extending straight and inclined with respect to the tire axial direction to the same direction as the middle axial grooves and the shoulder axial grooves on one side of the tire equator, each of the shoulder land portions is provided with shoulder sipes extending straight and inclined with respect to the tire axial direction to the same direction as the shoulder axial grooves therein so that the shoulder sipes alternate with the shoulder axial grooves, and each of the middle land portions is provided with middle sipes extending straight and inclined with respect to the tire axial direction to the same direction as the middle axial grooves therein so that the middle sipes alternate with the middle axial grooves.

12. The heavy duty tire according to claim 1, wherein the difference ($\theta s - \theta m$) between the angle $\theta s$ of the shoulder axial grooves and the angle $\theta m$ of the middle axial grooves is in a range from 2.5 to 5.5 degrees.

\* \* \* \* \*